US012730967B2

(12) United States Patent
Bernardis et al.

(10) Patent No.: US 12,730,967 B2
(45) Date of Patent: Sep. 8, 2026

(54) TRANSFORMER-BASED HYBRID RECOMMENDATION MODEL WITH CONTEXTUAL FEATURE SUPPORT

(71) Applicant: Oracle International Corporation, Redwood Shores, CA (US)

(72) Inventors: Cesare Bernardis, Zurich (CH); Damien Hilloulin, Zurich (CH); Rhicheek Patra, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 18/505,293

(22) Filed: Nov. 9, 2023

(65) Prior Publication Data

US 2025/0156637 A1 May 15, 2025

(51) Int. Cl.

| | |
|---|---|
| ***G06F 40/30*** | (2020.01) |
| ***G06F 16/9535*** | (2019.01) |
| ***G06F 40/284*** | (2020.01) |
| ***G06N 3/08*** | (2023.01) |
| ***G06N 20/00*** | (2019.01) |

(52) U.S. Cl.

CPC ........ *G06F 40/284* (2020.01); *G06F 16/9535* (2019.01)

(58) Field of Classification Search

CPC .......... G06F 40/30; G06F 16/33; G06N 20/30

See application file for complete search history.

(56) References Cited

U.S. PATENT DOCUMENTS

2020/0097544 A1* 3/2020 Alexander .............. G06F 40/35
2023/0185626 A1* 6/2023 Sankaranarayanan ....................... G06F 9/3836 718/102
2024/0143916 A1* 5/2024 Lee ......................... G10L 15/22
2024/0184835 A1* 6/2024 Luo ..................... G06F 16/2237
2024/0378396 A1* 11/2024 Bhupati ................ G06F 16/335
2025/0005644 A1* 1/2025 Ruan .................. G06Q 30/0631
2025/0095652 A1* 3/2025 Chen ..................... G10L 15/063

OTHER PUBLICATIONS

Hirschorn, James. "Transformer Implementation with the High-Level Keras API." (2021). (Year: 2021).*

(Continued)

*Primary Examiner* — Jialong He
(74) *Attorney, Agent, or Firm* — Hickman Becker Bingham Ledesma LLP

(57) ABSTRACT

In a computer-implemented embodiment, an interaction machine learning model is trained based on many interactions on many resources. A context lexical token is inferred that represents a current operational context of a user. The context lexical token is inserted into a sequence of other inferred lexical tokens. From the context lexical token within the sequence of tokens, the interaction machine learning model infers a predicted resource that will be accessed next. In an embodiment, accelerated matchmaking entails suitability measurement by a dot product of a) a dynamically inferred user embedding that is based on the context lexical token and b) a statically inferred item embedding.

18 Claims, 7 Drawing Sheets

(56) References Cited

OTHER PUBLICATIONS

Xu, Yu-Hao, et al. "A recommendation algorithm based on a self-supervised learning pretrain transformer." Neural Processing Letters 55.4 (2022): 4481-4497. (Year: 2022).*

Khrylchenko, Kirill, and Alexander Fritzler. "Personalized transformer-based ranking for e-commerce at yandex." arXiv preprint arXiv:2310.03481 (Oct. 2023). (Year: 2023).*

Li, Xiangyang, et al. "Inttower: the next generation of two-tower model for pre-ranking system." Proceedings of the 31st ACM International Conference on Information & Knowledge Management. 2022. (Year: 2022).*

Zhu et al., "Understanding masking & padding", [online] , retrieved from archive.org, published on Jun. 1, 2023. (Year: 2023).*

Caner, "Padding for NLP", [online], https://medium.com, published in 2020. (Year: 2020).*

Wang, S., et al. "Attention-Based Transactional Context Embedding for Next-Item Recommendation", Proceedings of the AAAI Conference on Artificial Intelligence, vol. 32, No. 1, 2018.

Villegas, Norha M., et al. "Characterizing context-aware recommender systems: A systematic literature review." Knowledge-Based Systems 140, 2018, 173-200.

Vaswani, Ashish, et al. "Attention is all you need." Advances in neural information processing systems 30, 2017.

Raza, Shaina et al. "Progress incontext-aware recommender systems—An overview", Computer Science Review 31, 2019, 84-97.

Javed, Umair, et al. "A review of content-based and context-based recommendation systems", International Journal of Emerging Technologies in Learning (iJET)16.3, 2021, 274-306.

Hu, Liang, et al. "Diversifying personalized recommendation with user-session context", Proceedings of the 26th International Joint Conference on Artificial Intelligence (IJCAI'17). AAAI Press, 2017, 1858-1864.

Caner, "Hands-on TensorFlow Tokenizer for NLP", available: https://medium.com/@canerkilinc/hands-on-tensorflow-tokenizer-for-nlp-392c97d5874d; retrieved on Nov. 19, 2025; 9 pages.

* cited by examiner

COMPUTER 100

CONTEXTUAL FEATURES PREPROCESSING 213

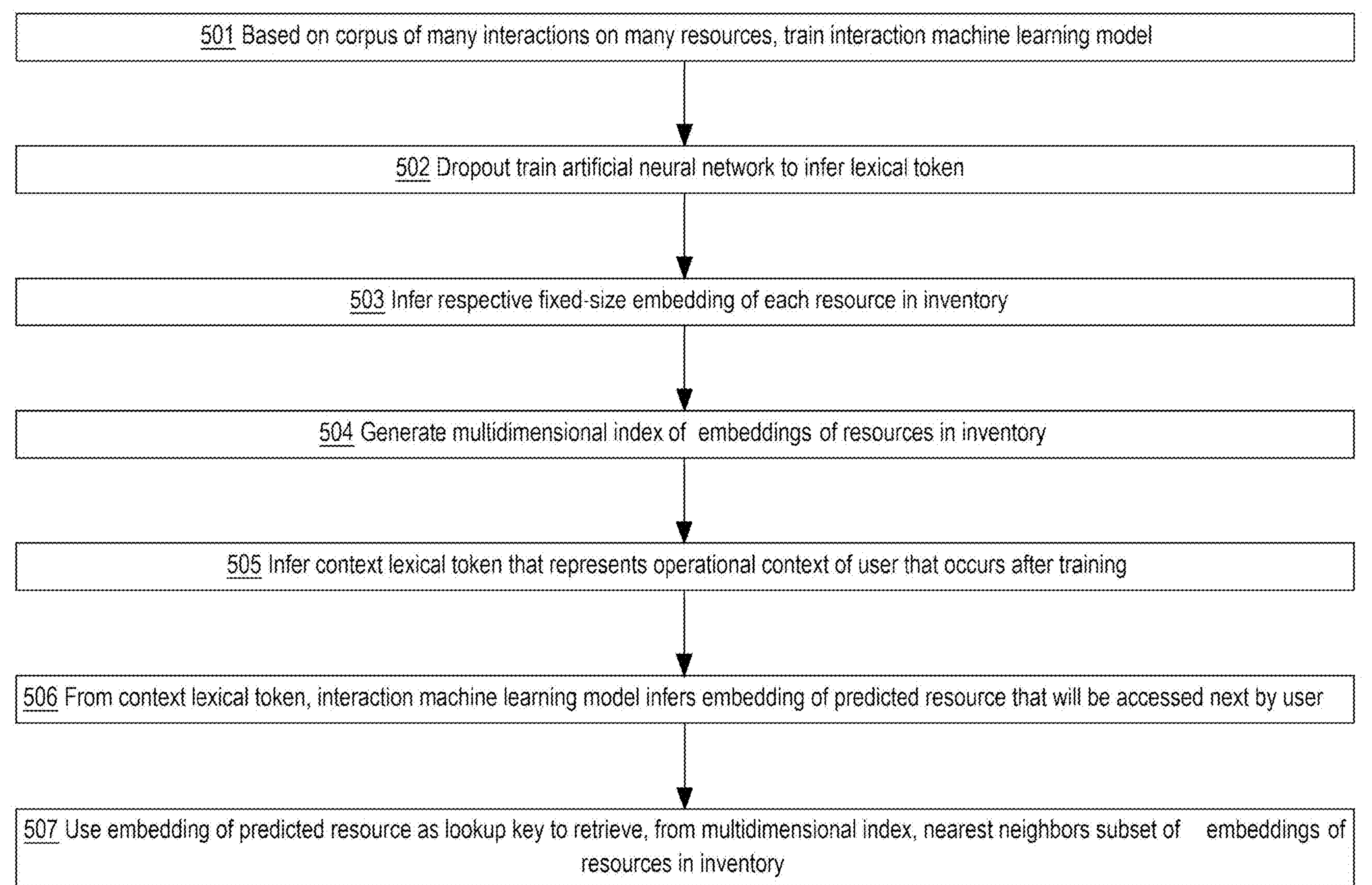
FIG. 5
501 Based on corpus of many interactions on many resources, train interaction machine learning model
502 Dropout train artificial neural network to infer lexical token
503 Infer respective fixed-size embedding of each resource in inventory
504 Generate multidimensional index of embeddings of resources in inventory
505 Infer context lexical token that represents operational context of user that occurs after training
506 From context lexical token, interaction machine learning model infers embedding of predicted resource that will be accessed next by user
507 Use embedding of predicted resource as lookup key to retrieve, from multidimensional index, nearest neighbors subset of embeddings of resources in inventory

TRANSFORMER-BASED HYBRID RECOMMENDATION MODEL WITH CONTEXTUAL FEATURE SUPPORT

FIELD OF THE INVENTION

The present invention relates to learned recommendation of content. Herein is learned embedding of interactions and context for faster and more accurate matchmaking.

BACKGROUND

A recommendation engine, also known as a recommender system, is a software application that provides personalized suggestions or recommendations to users. These recommendations are typically based on the users' histories and preferences. Recommendation engines are widely used in various applications to help users discover content or products that are relevant to their interests. Recommendation engines are used in e-commerce, streaming services, social media, and other platforms to improve user engagement, increase sales, and enhance user experiences. They help users discover products, services, or content that they are likely to find interesting, ultimately providing a more personalized and satisfying user experience.

The following are kinds of recommendation engines.

- Collaborative Filtering: This approach recommends items to users based on the preferences and behaviors of similar users. It identifies users who have similar tastes and suggests items that those similar users have liked or interacted with.
- Content-Based Filtering: Content-based recommendation engines recommend items to users based on the attributes or features of the items and the user's past preferences. For example, in a movie recommendation system, it might recommend movies with similar genres, actors, or directors to those the user has liked before.
- Matrix Factorization: Matrix factorization methods decompose user-item interaction matrices into latent factors to make predictions about user preferences. Techniques like Singular Value Decomposition (SVD) and matrix factorization are used in these models.
- Reinforcement Learning-Based Recommendations: In some cases, recommendation engines are built using reinforcement learning techniques, where recommendations are treated as actions, and the system learns to make recommendations by optimizing a reward function.
- Deep Learning-Based Recommendations: Deep learning models, such as neural collaborative filtering (NeuMF) and recurrent neural networks (RNNs), have been applied to recommendation systems to capture complex patterns in user behavior and item characteristics.

A state of the art recommendation engine and its recommendations are more or less static. For example, a same user at different times may have different needs, which unfortunately may not dynamically cause different recommendations in the state of the art. In that way, recommendations may have decreased relevance (i.e. accuracy).

BRIEF DESCRIPTION OF THE DRAWINGS

In the drawings:

FIG. 5 is a flow diagram that depicts an example computer process for self-supervised multitask learning (MTL) by a two-tower model and for listing recommendations whose generation and ranking is context sensitive;

DETAILED DESCRIPTION

Figure 1:
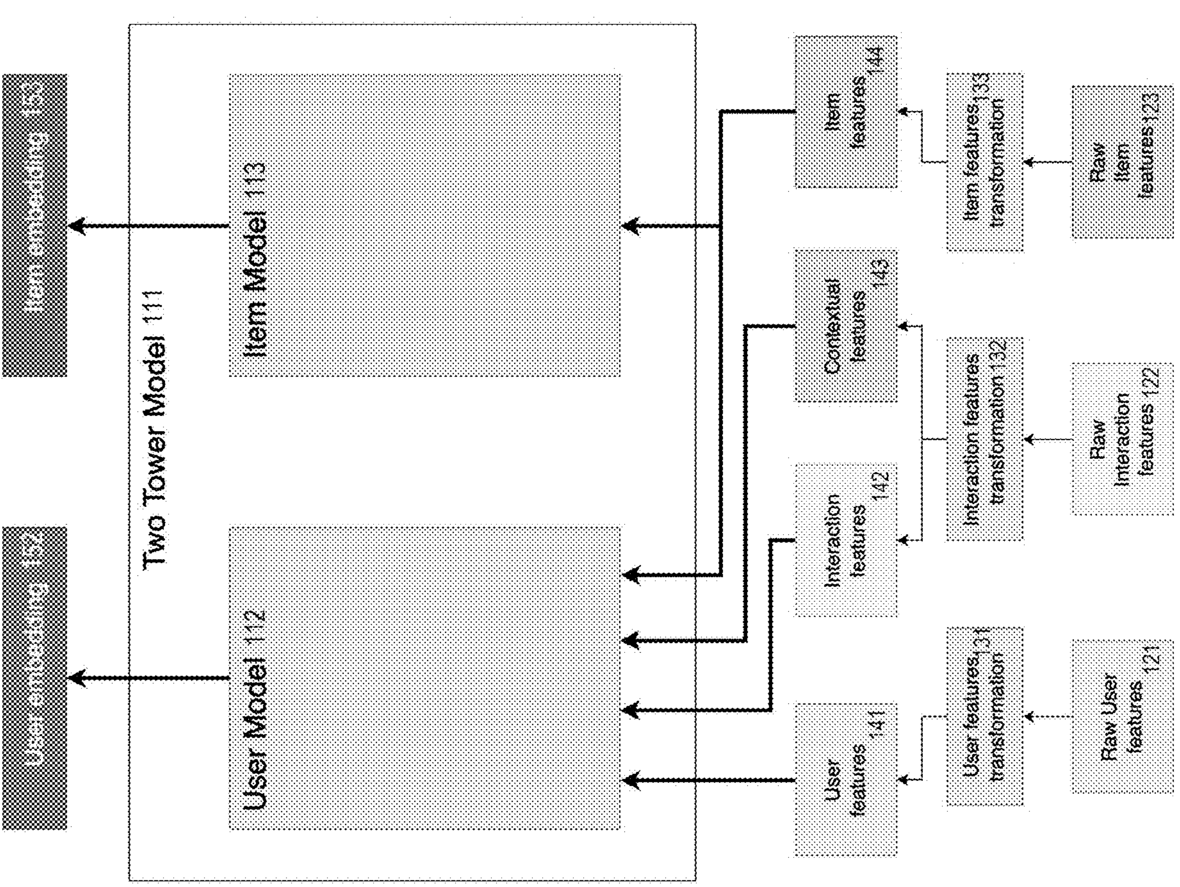
FIG. 1 is a block diagram that depicts an example computer that dynamically infers a user embedding that is context sensitive and may be used as a prediction of a resource that the user will access next.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is learned recommendation of content based on learned embedding of dynamic details, such as interactions and context, for faster and more accurate matchmaking. A contextual feature may be any feature that describes a current operating context of a user when the user requests a recommendation. A contextual feature cannot be determined in advance. Contextual features may represent a wide spectrum of information that ranges from the date and time when a recommendation is requested, to the device that the user is using, or the city where the user is currently located. These features represent a valuable source of information that can impact the quality (i.e. accuracy) of a recommendation.

For example, a recommender system may be for a fashion e-commerce website. In fashion, seasonality has a strong impact on which recommendations should be provided. When summer is approaching, the recommendation engine should suggest swim suits and shorts. However, coats and pullovers should be recommended if winter is coming instead.

Herein is a so-called two-tower model that combines several sources of information, including the user, item, and interaction features, to obtain user and item vector representations (i.e. embeddings). Herein, embeddings of items and users are multiplied together to obtain a suitability (i.e. relevance) score that indicates a level of preference predicted for each user-item pairing. The higher the score, the higher the preference, and the better is the match of item to user. To provide a list of recommendations for a user, the model computes, for the user, a preference score for every item in a catalog and selects the best items, which have the highest predicted scores.

A two-tower model is a model composed of two main blocks (i.e. towers) that are a user tower and an item tower. Herein, the user tower is responsible for generating a user embedding that takes into account user, item, and interaction features. Item and interaction features are contained in a sequence of past interactions of each user to personalize the final representation of the user based on user's taste and habits. The item tower is responsible for generating an item embedding that takes into account respective features of the item.

Contextual features are processed in the user tower to influence the user embedding in a dynamic way that is well suited for predictions such as which item will the user access next. With next item recommendation, search results may be a list of recommended items with which a user is most likely to interact with next. That is an example of matchmaking, for which the model computes suitability scores between the user that is going to receive the recommendation and (e.g. all) items in a catalog. During dynamic matchmaking that is more or less instantaneous, the user and the context of the recommendation remain constant. Therefore, the model recomputes the user embedding only once when recommendations are requested. The user embedding is multiplied by each of the precomputed item embeddings, which is computationally fast and further accelerated, for example, by batching or concurrency. In a production environment, scalability in the number of users that can be concurrently served, and latency in providing a list of recommendations are important performance concerns to an enterprise service. Latency and scalability are improved by decreasing the amount of computation performed during matchmaking.

This approach has at least the following innovations. Contextual features are introduced in the user tower. The contextual features are densely encoded into a context lexical token that is analyzed by natural language processing (NLP) transformers. These innovations have at least the following advantages. This approach is able to combine several sources of information with the contextual information, in order to adapt recommendations based on the context of where and when the prediction is requested. This contextual sensitivity provides unprecedented relevance (i.e. accuracy) of recommendations whose dynamic generation is accelerated in various ways.

In a computer-implemented embodiment, an interaction machine learning model is trained based on many interactions on many resources. A context lexical token is inferred that represents a current operational context of a user. The context lexical token is inserted into a sequence of other inferred lexical tokens. From the context lexical token within the sequence of tokens, the interaction machine learning model infers a predicted resource that will be accessed next. In an embodiment, accelerated matchmaking entails suitability measurement by a dot product of a) a dynamically inferred user embedding that is based on the context lexical token and b) a statically (i.e. precomputed) inferred item embedding.

1.0 Example Computer

FIG. 1 is a block diagram that depicts an example computer 100, in an embodiment. Computer 100 may be one or more of a rack server such as a blade, a mainframe, a personal computer, or a virtual machine.

The lifecycle of two-tower model 111 has three phases that are training followed by cataloging followed by searching. During the searching phase of a deployment in a production environment, components 112, 121-123, 131-133, 141-144, and 152-153 are stored and operated in random access memory (RAM) of computer 100, but item model 113 can be absent. During the cataloging phase, components 113, 123, 133, 144, and 153 are stored and operated in the RAM, but components 112, 121-122, 131-132, 141-143, and 152 can be absent.

During training, all components shown in FIG. 1 are stored and operated in the RAM. The training phase may occur on a computer, the cataloging phase may occur on a computer, and the searching phase may occur on a computer, and these may be same or different computers in same or different environments.

1.1 Example Two-Tower Model

Machine learning models 112-113 are independent such that their inferencing is decoupled and does not accept a shared data structure as input. However during training, machine learning models 112-113 may train together. User model 112 accepts features 141-144 in an input that may, for example, be generated from various tables (not shown) in a training corpus. For example, raw features 121-123 may be stored in three respective tables whose columns may store individual features. Raw user features 121 may be in one row in a first table; raw interaction features 122 may be in one row in a second table; and raw item features 123 may be in one row in a third table. Each of those three tables may have a different count of rows (i.e. training records). Any of those three tables may have the most or least count of rows.

A distinct training input that user model 112 accepts may be generated from each row (i.e. user) in the table that contains raw user features 121, and that training input also contains data generated from zero or more rows in the table that contains raw interaction features 122 that represent interactions already performed by the user. Each interaction involves exactly one resource (i.e. item), and the training input accepted by user model 112 also contains, for each of those interactions, data generated from a raw item features 123 that represents a non-distinct respective resource.

Raw interaction features 122 represents a distinct interaction in which a user accessed a resource. For example, raw interaction features 122 may be columns in a distinct row in an associative table (not shown), and each row in the associative table may also contain a foreign key of a row in the table that contains raw user features 121 and a foreign key of a row in the table that contains raw item features 123. Multiple rows in the associative table may refer to a same user or a same resource. Through the associative table, there is a many-to-many association of users to resources.

Herein, an item may also be referred to as a resource, a content, or a content item. In an embodiment, a resource is a digital artifact such as a database record, a file, a webpage, or an electronic document. For example, a resource may be uniquely identified by an integer serial number such as an array offset, a primary key, a globally unique identifier (GUID), a universal resource identifier (URI), or a universal resource locator (URL). Likewise, each user may have a unique identifier such as an account number. Each interaction may be sequenced and/or identified by a timestamp stored with the interaction. Any row in any table in the training corpus may have a primary key that is or is not a natural key.

Raw features 121-123 may consist of many features that each has a respective datatype such as a number, a string (i.e. text), or a compound data structure. For example, a string feature may have variable size. Features transformations 131-133 generate respective distinct feature vectors 141-144 as shown from a row in the table that contains a respective raw features 121-123. Although user features transformations 131 always generates user features 141 as a fixed-size feature vector, each of feature vectors 141-144 may have its own distinct fixed size and internal format. Interaction features transformation 132 generates both distinct feature vectors 142-143. Features transformations 131-133 may encode features by one-hot encoding, hash encoding, or other numeric encoding. Feature vectors 141-144 are distinct numeric arrays.

The sole purpose of item model 113 is to infer (i.e. generate), during the cataloging phase, a distinct fixed-size item embedding 153 for each resource in the training corpus. After cataloging, the many item embeddings 153 are retained even if item model 113 is discarded. The many retained item embeddings 153 are collectively referred to herein as inventory or a catalog, which is searchable during the searching phase.

1.2 Dynamism by Context Sensitivity

Interaction features transformation 132 generates a distinct interaction features 142 that represents a respective distinct interaction (i.e. row) in the table that contains raw interaction features 122. A few or one of the most recent interactions may be used to generate contextual features 143. Context features 143 represent current operating environment of a user, including details such as which device of the user, a current time or date or season, and a current geographic location. Although raw interaction features 122 are historic (i.e. previously recorded), context features 143 is dynamic.

Distinct feature vectors 141-144 are concatenated to generate a combined feature vector that user model 112 accepts as input, which causes user model 112 to generate user embedding 152 that has a same fixed size and internal format as item embedding 153. User embedding 152 is context sensitive and may be used as a prediction of a resource that the user will access next as discussed later herein.

2.0 First Example User Model

Figure 2:
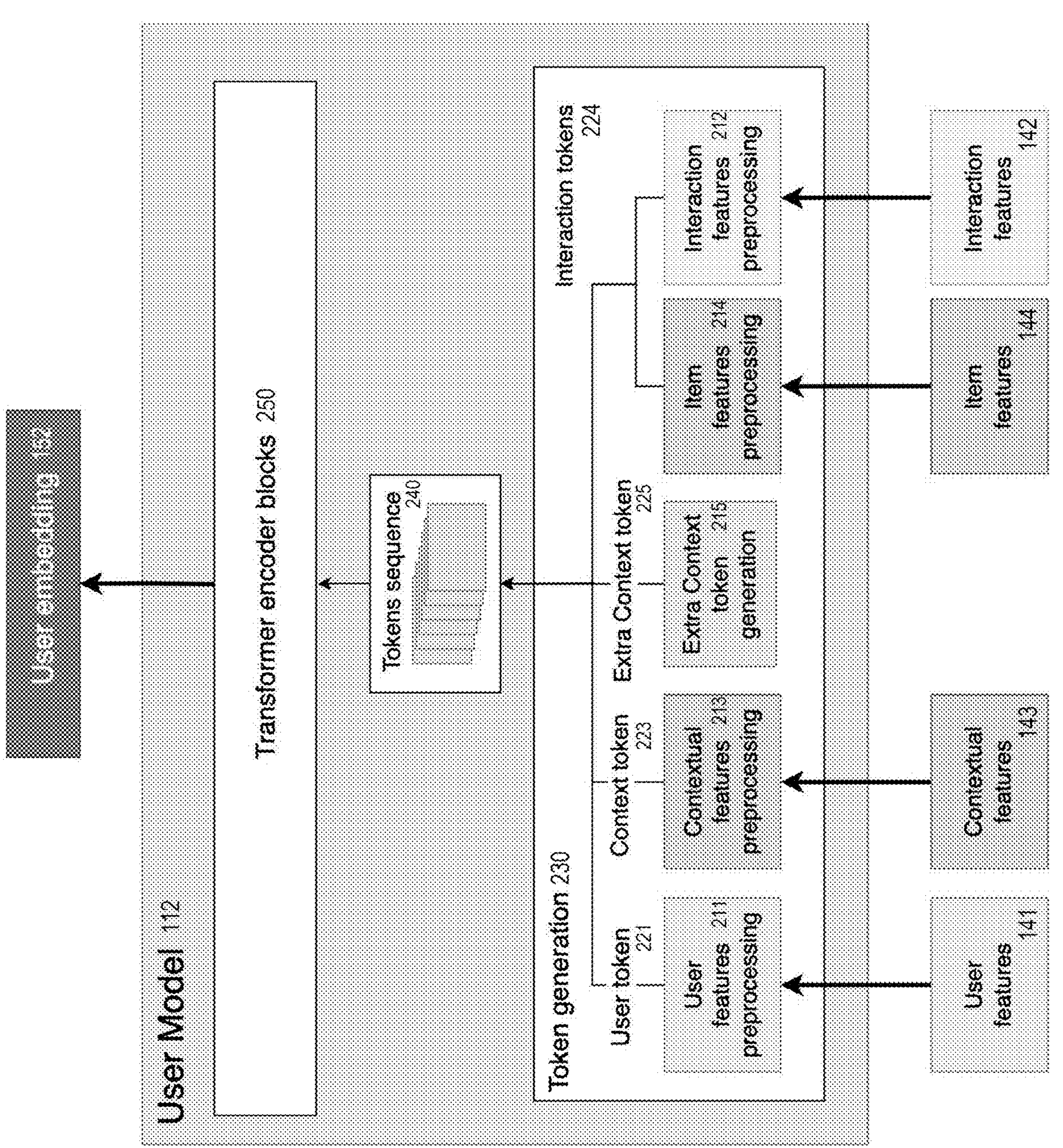
FIG. 2 is a block diagram that depicts an example user model that dynamically infers the user embedding.

FIG. 2 is a block diagram that depicts an example embodiment of user model 112 that infers an example user embedding 152 that is context sensitive and may be used as a prediction of a resource that the user will access next as discussed later herein. User model 112 performs token generation 230 that generates token sequence 240.

Each of features processing 211 and 213 is a distinct machine learning model that accepts a respective feature vector 141 or 143 as input and infers a fixed-size embedding that token generator 230 appends as lexical token 221 or 223 onto token sequence 240. Lexical tokens 221 and 223-224 are inferred by a respective machine learning model. Extra context token generation 215 is not a machine learning model, and extra context token 225 is hardcoded instead of inferred. Extra context token 225 does not represent data from the training corpus nor any other data. Extra context token 225 is appended onto token sequence 240.

To infer token sequence 240, token generation 230 accepts: a) only one instance of each of feature vectors 141 and 143, b) a sequence of none, one, or multiple instances of interaction features 142, and c) a sequence of a same count of instances of item features 144 as (b), which is one non-distinct resource per interaction as indicated in the interaction. Each of features processing 212 and 214 is a distinct machine learning model that accepts a respective feature vector 142 or 144 as input and infers a fixed-size embedding that token generator 230 concatenates to generate a combined lexical token. Thus, sequences (a)-(b) are used to infer interaction tokens 224 that are a sequence of lexical tokens that has one token per interaction. Interaction tokens 224 is appended onto token sequence 240. Item features processing 214 is not item model 113, and interaction tokens 224 are not based on item embedding 153.

Transformer encoder blocks 250 may be implemented as a large language model (LLM) such as bidirectional encoding representation for transformers (BERT), which is a kind of artificial neural network. Transformer encoder blocks 250 accepts token sequence 240 as input and infers user embedding 152 that is context sensitive and may be used as a prediction of a resource that the user will access next as discussed later herein. The machine learning model architecture of features preprocessing 211-214 is discussed later herein.

3.0 Example Context Token

Figure 3:
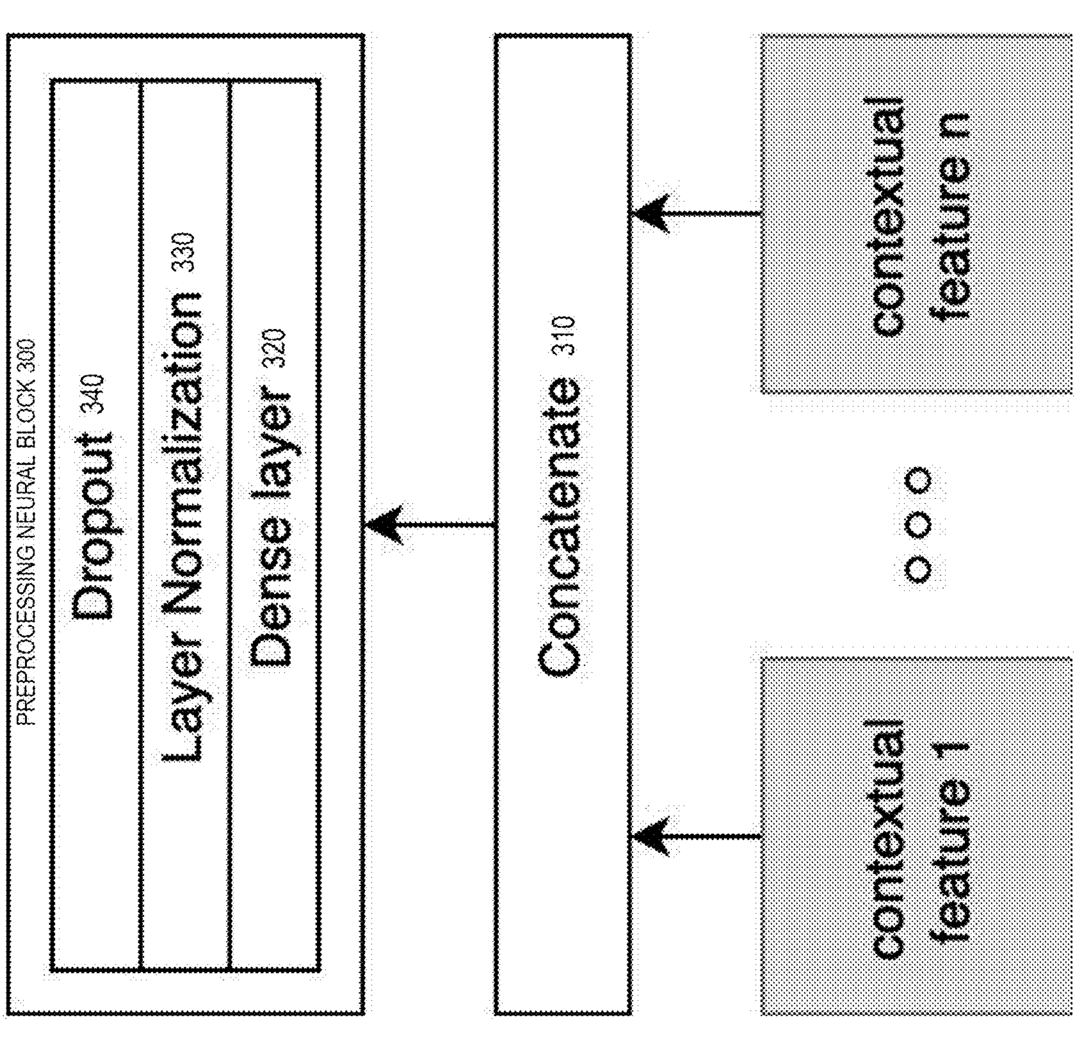
FIG. 3 is a block diagram that depicts an example neural network embodiment of contextual features processing that infers a context lexical token from contextual features.

FIG. 3 is a block diagram that depicts an example neural network embodiment of contextual features processing 213 that infers an example context token 223 from contextual features 143, shown as many individual contextual features 1-n. FIG. 3 may operate according to the following example python pseudocode that uses TensorFlow as a deep (i.e. neural) learning framework.

```
#Transform the contextual features if needed
#For example, one-hot encode categorical features, normalize continuous #ones, etc.
transformed_contextual_features=[transform(feature) for feature in contextual_features]
#Then concatenate the features to make them become a single vector
transformed_contextual_features=tf.keras.layers.Concatenate(axis=1) (transformed_contextual_features)
#Define the preprocessing block
preprocessing_block=tf.keras.Sequential([tf.keras.layers.Dense (num_units),
tf.keras.layers.LayerNormalization ( ),
tf.keras.layers.Dropout (dropout_rate),])
#Preprocess features
preprocessed_contextual_features=
preprocessing_block(transformed_contextual_features)
```

The following terms have the following meanings in the above pseudocode.

contextual_features is raw interaction features 122.

transform(feature) is part of interactions features transformation 132.

Concatenate(transformed_contextual_features) is concatenate 310 that concatenates individual contextual features 1-n into contextual features 143 that is a feature vector. Concatenate 310 is hardcoded (i.e. not trainable).

preprocessing_block is trainable preprocessing neural block 300.

num_units is a hyperparameter that is a count of neurons in a particular layer.

Dense( ) is dense layer 320 that is a neural layer whose neurons are fully connected to contextual features 1-n as inputs. Dense layer 320 is the only neural layer in preprocessing neural block 300.

LayerNormalization( ) is layer normalization 330 that normalizes activations generated by neurons in dense layer 320, making the activations have a standardized scale and distribution.

dropout_rate is a training hyperparameter that is a probability that a neuron in a particular layer will not contribute during training to an inference being generated.

Dropout( ) is dropout 340 that imposes dropout regularization on dense layer 320 during training.

Preprocessing neural block 300 learns to dynamically infer (i.e. generate) context token 223 that represents the current operating context of a user.

Although preprocessing neural block 300 is part of contextual features preprocessing 213, other features preprocessing 211-212 and 214 may each be a distinct machine learning model whose architecture and operation is similar to FIG. 3. Thus, much of token generation 230 may be neural and trainable to infer highly accurate lexical tokens in tokens sequence 240.

4.0 Second Example User Model

Figure 4:
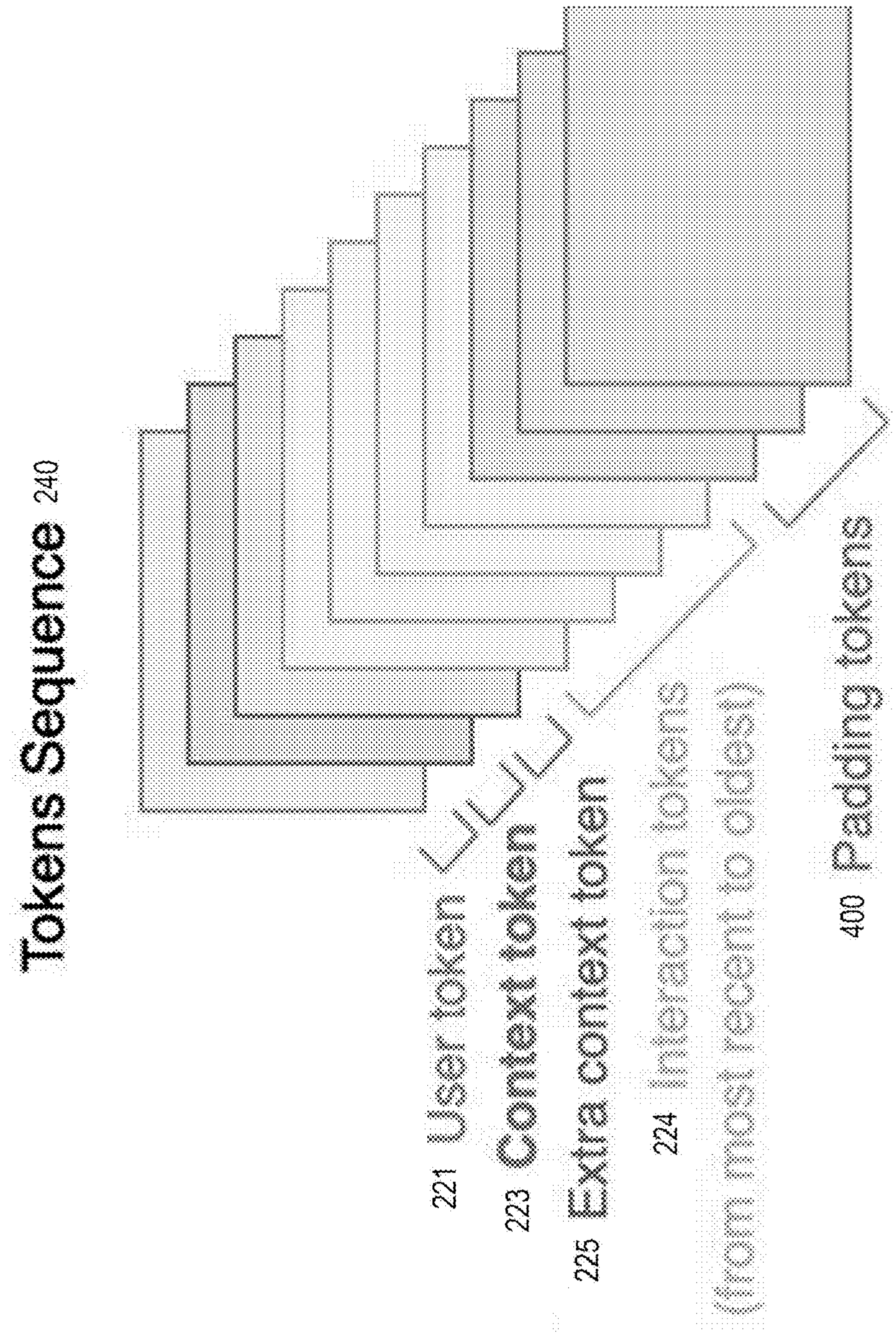
FIG. 4 is a block diagram that depicts an example lexical tokens sequence that is accepted as natural language processing (NLP) input from which the user embedding is inferred.

FIG. 4 is a block diagram that depicts an example embodiment of tokens sequence 240 that is accepted as natural language processing (NLP) input from which user embedding 152 is inferred. Tokens sequence 240 has a shown ordering that is user token 221, context token 223, extra context token 225, interaction tokens 224 (in descending temporal ordering, i.e. ascending age) and, lastly, zero or more padding tokens 400. Interaction tokens 224 contains a variable amount of lexical tokens that may be fewer if a user has had few (e.g. recent) interactions. During the searching phase in production, interaction tokens 224 may, for example, represent interactions that occurred after training, in which case those interactions are not in the training corpus.

For acceleration, a (e.g. training) batch may be a memory buffer that contains multiple inputs (i.e. multiple instances of tokens sequence 240) whose respective addresses are aligned to a uniform size. In that case, zero or more of the oldest of interaction tokens 224 are truncated (e.g. discarded) to enforce the uniform size when being copied into the batch. Also to enforce the uniform size, zero or more padding tokens 400 may be appended to extend tokens sequence 240. In an embodiment without batching, padding tokens 400 may be unimplemented.

Depending on the application, transformer encoder blocks 250 may or may not learn to ignore padding tokens 400. For example, a count of padding tokens 400 may indicate, to transformer encoder blocks 250, how recent (i.e. new) or inactive is a user.

Token sequence 240 may be accepted as an input by transformer encoder blocks 250 to infer user embedding 152, according to the following example python pseudocode that uses TensorFlow as a deep learning framework,

```
#Concatenate all the tokens to get the sequence
tokens_sequence=tf.keras.layers.Concatenate(axis=1)
  ([user_embedding, context_embedding, interactions_embeddings,])
#Get positional embeddings and add them to each token
  in the sequence position_embeddings= PositionEmbeddingsLayer(sequence_length, num_units) (tokens_sequence)
transformer_output=tf.keras.layers.Add( ) ([tokens_sequence, position_embeddings])
transformer_output=tf.keras.layers.Dropout(dropout_rate) (transformer_output)
#Multiple Multi-head self-attention blocks
#Tensorflow has tutorial on how to build a block for in
  range(num_attention_blocks):
transformer_output=MultiHeadSelfAttention(num_units,
  num_heads, dropout_rate) (transformer_output)
feed_forward_output=tf.keras.layers.Dense(num_units)
  (transformer_output)
transformer_output=tf.keras.layers.Add( ) ([transformer_output, feed_forward_output])
transformer_output=tf.keras.layers.LayerNormalization
  ( ) (transformer_output)
#Aggregate the tokens to get the user embedding
  user_embedding=aggregate(transformer_output,
  axis=1)
```

The following terms have the following meanings in the above pseudocode.

tokens_sequence is tokens sequence 240.

user_embedding initially is user token 221 but is then reassigned to be user embedding 152.

context_embedding is context token 223.

interactions_embeddings is interaction tokens 224.

sequence_length is a count of lexical tokens in tokens sequence 240 that may, for example, be a hyperparameter that is the uniform size in a batch as discussed earlier herein.

PositionEmbeddingsLayer decorates each lexical token with its numeric position in token sequence 240.

num_attention_blocks is a hyperparameter that is a count of neural self-attention blocks.

num_heads is a hyperparameter that is a count of neural attention heads in each self-attention block.

MultiHeadSelfAttention( ) generates transformer encoder blocks 250.

transformer_output is transformer encoder blocks 250.

aggregate( ) generates user embedding 152, for example, by combining learned (i.e. by transformer encoder blocks 250) token embeddings (not shown) of individual lexical tokens in tokens sequence 240.

4.1 Example Matchmaking

User embedding 152 is context sensitive and may be used as a prediction of a resource that the user will access next. An advantage of user embedding 152 is that it may be used as a search key for accelerated vector similarity searching that exploits a vector index. In this exemplary embodiment, a vector search accepts a one-dimensional vector (e.g. numeric array) as a retrieval (i.e. lookup) key to access nearest neighbor(s) in a vector index populated by many points that each is a distinct item embedding 153 in the inventory (i.e. catalog) as discussed earlier herein. Each item embedding 153 is a fixed-size array of numbers, and each number in the array corresponds to a distinct dimension in the multidimensional vector space. In other words, the vector index is a multidimensional index. Data structures and techniques for an accelerated embodiment of a vector similarity searching vector index are presented in U.S. provisional patent application 63/583,298 "Vector Search Over Joins" filed by Shasank Kisan Chavan et al on Sep. 17, 2023 that is incorporated herein in its entirety; and in U.S. provisional patent application 63/583,259 "AI Vector Support For Relational Databases" filed by Tirthankar Lahiri et al on Sep. 16, 2023 that is incorporated herein in its entirety.

User embedding 152 is used as a lookup key to retrieve item embedding(s) 153 that are nearest neighbor(s) in the multidimensional index. In an embodiment, embeddings 152-153 are numeric arrays of a same fixed size, and similarity (i.e. suitability, relevance) of embeddings 152-153 may be measured by the dot product of embeddings 152-153, which is a number (i.e. a scalar magnitude). The higher is a suitability measurement, the more likely is the resource to be accessed next by the user. Because user embedding 152 is contextual (i.e. dynamic), the suitability measurement also is contextual, which increases the relevance (i.e. accuracy) of the nearest neighbor(s) that are presented as resulting matches (i.e. recommendations). In various embodiments, suitability measurements are used to detect (i.e. matchmake), filter, or rank the resources that are nearest neighbors. For example, the most suitable resources for the user and the operational context may be presented (e.g. displayed) to the user for interactive selection such as by a pointer device.

In an embodiment, the resources are online documents, webpages, or emails that can be listed in search results that are contextual and personalized. Herein, personalized means that two users in substantially equivalent contexts receive different or differently ranked search results because the users have distinct raw user features 121. Herein, contextual means a same user in two different contexts receives different or differently ranked search results because the two contexts have distinct context tokens 223 inferred from respective distinct contextual features 143. Herein, both of personalization and contextualization are embodied in user embedding 152 that is dynamic and that affects dynamic generation and ranking (i.e. sorting) of search results.

5.0 Example Training and Matchmaking Process

FIG. 5 is a flow diagram that depicts an example process that computer 100 may perform for self-supervised multitask learning (MTL) by two-tower model 111 and for listing recommendations whose generation and ranking is context sensitive.

The lifecycle of two-tower model 111 has a training phase that entails steps 501-502 followed by a cataloging phase that entails steps 503-504 followed by a searching phase that entails steps 505-507. Based on a training corpus that contains records of many interactions on many resources, step 501 multitask learning trains two-tower model 111. Interactions by one user effectively is a timeseries, which means that step 501 can be self-supervised by backtesting because, during training, user embedding 152 is a prediction of an interaction that actually is in the training corpus and that already happened. Herein, user model 112 is also referred to as an interaction machine learning model, and an item in inventory is also referred to as a resource.

In an embodiment, training step 501 is supervised instead of self-supervised. For example, two-tower model 111 may train to replace a legacy recommendation engine whose search results lists are used as training labels (i.e. known correct recommendations).

In an embodiment, multitask learning means that machine learning models 112-113 have distinct respective training tasks but share a single error (i.e. loss) measurement. For example, inaccuracy of user embedding 152 may be a measured error that can be applied (e.g. neural backpropagated) to both machine learning models 112-113 so that they co-learn. In that case, inaccuracy (i.e. error) of item embedding 153 is not measured. However, error measurement of user embedding 152 may be based on user embedding 152 and one or more item embeddings 153.

In an embodiment, one, some, or all of features preprocessing 211-214 are artificial neural networks for which training step 501 has sub-step 502 that dropout trains the neural network to infer a lexical token. For example, substep 502 may use dropout 340 as discussed earlier herein.

After training two-tower model 111, item model 113 infers a respective fixed-size item embedding 153 for each resource in the inventory in the training corpus in step 503. In an embodiment that will accelerate step 507, a multidimensional index of item embeddings 153 of all resources in the inventory is generated in step 504, which completes the cataloging phase.

After training and cataloging and deployment into production, then highly dynamic and highly accurate matchmaking, which is a search for recommendation(s), may occur for a particular user in a particular context as follows. Step 505 infers context token 223 that is a lexical token that densely represents the current operational context of the user.

From context token 223, the interaction machine learning model (i.e. user model 112) infers dense user embedding 152 that is a prediction of which resource(s) are most likely to be accessed next by the user. Step 507 uses user embedding 152 as a lookup key for accelerated retrieval, from the multidimensional index, a nearest neighbor(s) subset of item embeddings 153 of resources in inventory.

In various embodiments, suitability measurements are used to detect (i.e. matchmake), filter, or rank the resources that are nearest neighbors as discussed earlier herein. For the user and the current operational context, the most suitable resources may be presented (e.g. displayed) to the user for interactive selection such as by a pointer device that, for example, may cause retrieval and display of the interactively selected resource.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
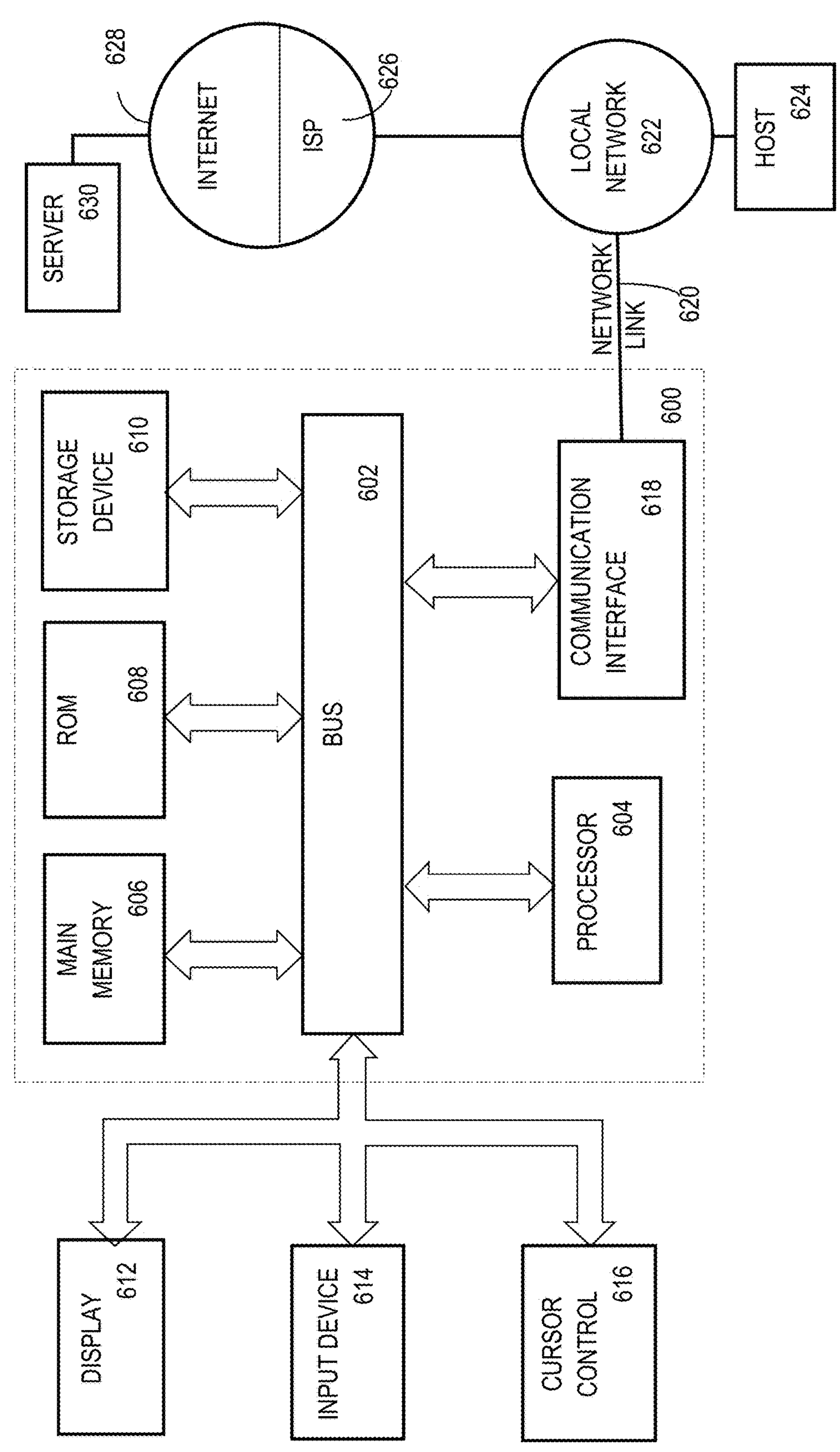
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
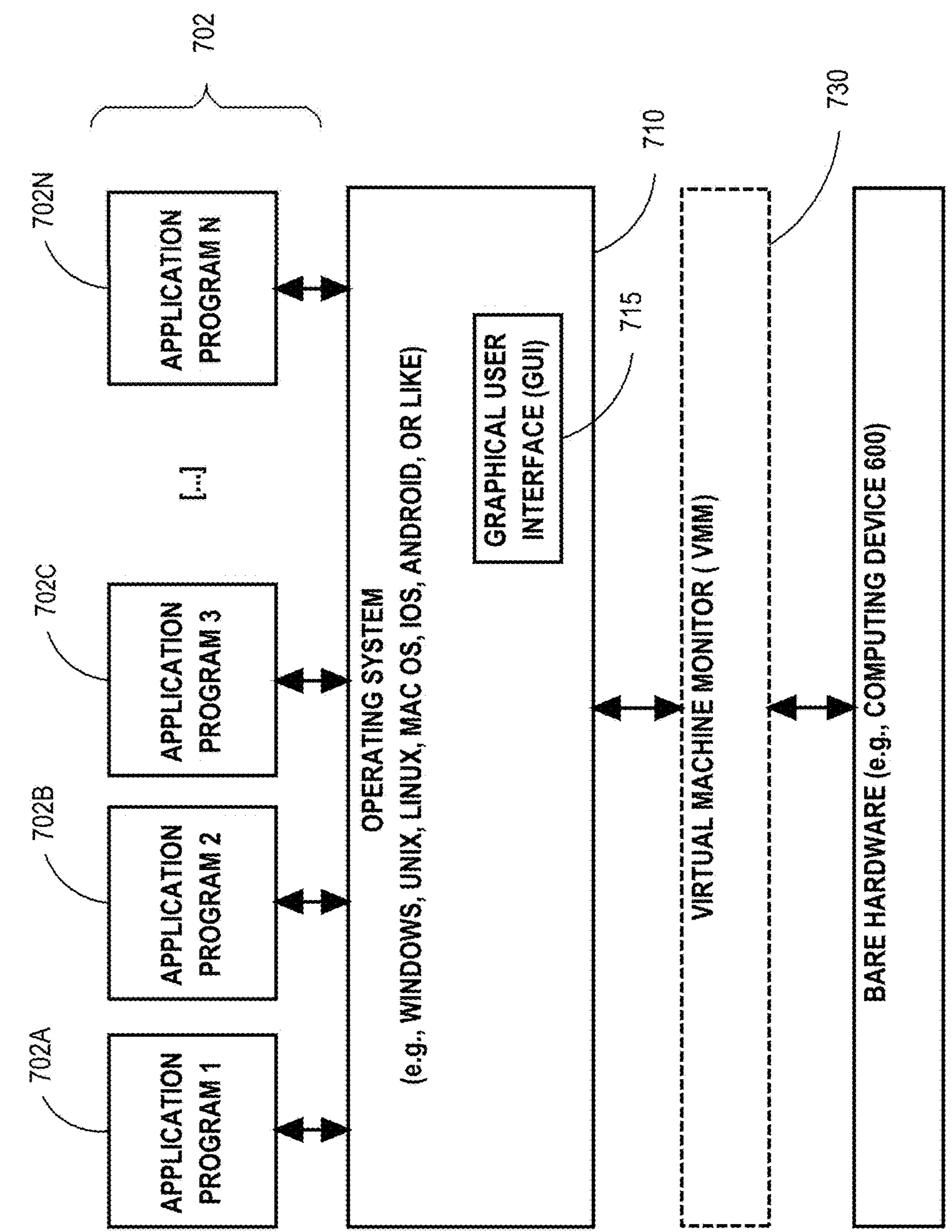
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria are met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of the best breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neurons.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as a vector. Training data comprises multiple inputs, each being referred to as a sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Fewer neurons means fewer activation values need be computed, and/or fewer derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in a matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that are not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depend on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

training, based on a plurality of interactions on a plurality of resources, an interaction large language model (LLM);

generating a context lexical token that represents an operational context, wherein the operational context occurs after said training the interaction LLM; and inferring by the interaction LLM, from an input, a predicted resource of said plurality of resources that will be accessed next, wherein the input comprises the context lexical token, a contiguous plurality of padding tokens, a temporal sequence of interaction lexical tokens that each represents a respective distinct interaction that was already caused by a particular user, and a lexical token that represents the particular user in the operational context.

2. The method of claim 1 wherein said inferring the predicted resource that will be accessed is based on a sequence of lexical tokens that comprises:

the context lexical token, a temporal sequence of interaction lexical tokens that each represents a respective distinct interaction that was already caused by a particular user, and between the context lexical token and said temporal sequence of interaction lexical tokens, a predefined lexical token that does not represent data.

3. The method of claim 1 further comprising inferring a particular lexical token that is a fixed-size embedding of an object, wherein the particular lexical token is selected from a group consisting of the context lexical token and an interaction lexical token that represents a respective distinct access of a respective resource by a particular user.

4. The method of claim 3 further comprising dropout training an artificial neural network to perform said inferring the particular lexical token.

5. The method of claim 1 further comprising inferring a respective fixed-size embedding of each resource in the plurality of resources.

6. The method of claim 5 further comprising generating a multidimensional index of said fixed-size embeddings of the plurality of resources.

7. The method of claim 6 further comprising using the predicted resource that will be accessed as a lookup key to retrieve, from the multidimensional index, a nearest neighbors subset of the fixed-size embeddings of the plurality of resources.

8. The method of claim 7 wherein:

said inferring the predicted resource that will be accessed comprises generating a fixed-size embedding of the predicted resource;

said using the predicted resource that will be accessed as the lookup key comprises using the fixed-size embedding of the predicted resource as the lookup key.

9. The method of claim 8 further comprising selecting, filtering, or ranking the nearest neighbors subset of the plurality of resources based on a respective dot product of the fixed-size embedding of the predicted resource and each fixed-size embeddings of the nearest neighbors subset of the fixed-size embeddings of the plurality of resources.

10. The method of claim 1 wherein said inferring the predicted resource that will be accessed is based on a temporal sequence of interactions that occurred after said plurality of interactions.

11. One or more non-transitory computer-readable media storing instructions that, when executed by one or more processors, cause:

training, based on a plurality of interactions on a plurality of resources, an interaction large language model (LLM);

generating a context lexical token that represents an operational context, wherein the operational context occurs after said training the interaction LLM; and inferring by the interaction LLM, from an input, a predicted resource of said plurality of resources that will be accessed next, wherein the input comprises the context lexical token, a contiguous plurality of padding tokens, a temporal sequence of interaction lexical tokens that each represents a respective distinct interaction that was already caused by a particular user, and a lexical token that represents the particular user in the operational context.

12. The one or more non-transitory computer-readable media of claim 11 wherein said inferring the predicted resource that will be accessed is based on a sequence of lexical tokens that comprises:

the context lexical token, a temporal sequence of interaction lexical tokens that each represents a respective distinct interaction that was already caused by a particular user, and between the context lexical token and said temporal sequence of interaction lexical tokens, a predefined lexical token that does not represent data.

13. The one or more non-transitory computer-readable media of claim 11 wherein:

the instructions further cause inferring a particular lexical token that is a fixed-size embedding of an object;

the particular lexical token is selected from a group consisting of the context lexical token and an interaction lexical token that represents a respective distinct access of a respective resource by a particular user.

14. The one or more non-transitory computer-readable media of claim 13 wherein the instructions further cause dropout training an artificial neural network to perform said inferring the particular lexical token.

15. The one or more non-transitory computer-readable media of claim 11 wherein the instructions further cause inferring a respective fixed-size embedding of each resource in the plurality of resources.

16. The one or more non-transitory computer-readable media of claim 15 wherein the instructions further cause generating a multidimensional index of said fixed-size embeddings of the plurality of resources.

17. The one or more non-transitory computer-readable media of claim 16 wherein the instructions further cause using the predicted resource that will be accessed as a lookup key to retrieve, from the multidimensional index, a nearest neighbors subset of the fixed-size embeddings of the plurality of resources.

18. The one or more non-transitory computer-readable media of claim 11 wherein said inferring the predicted resource that will be accessed is based on a temporal sequence of interactions that occurred after said plurality of interactions.

* * * * *